April 22, 1958     H. A. PERKINS, JR     2,832,066
MEMORY ELEMENTS FOR ELECTRICAL CONTROL SYSTEMS
Filed March 28, 1956
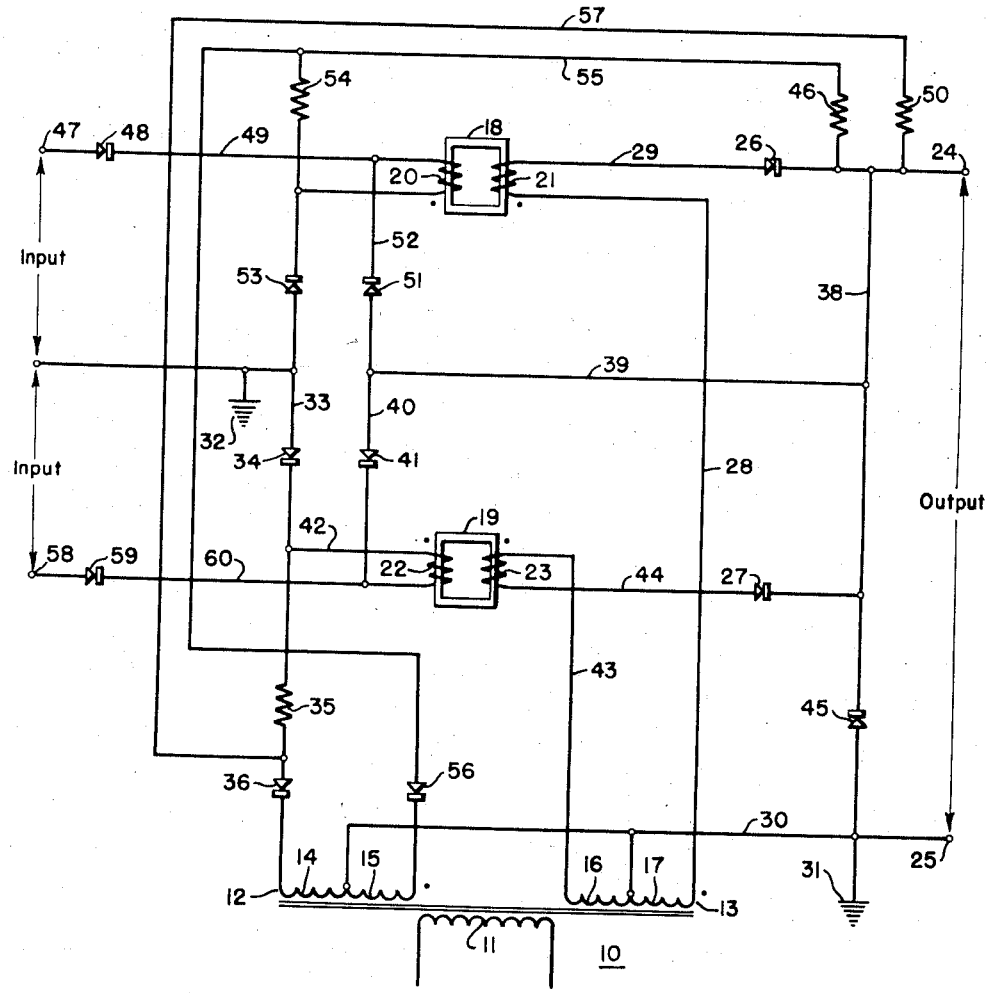
WITNESSES:
INVENTOR
Harley A. Perkins, Jr.
BY
ATTORNEY

United States Patent Office 2,832,066
Patented Apr. 22, 1958

2,832,066
MEMORY ELEMENTS FOR ELECTRICAL CONTROL SYSTEMS

Harley A. Perkins, Jr., Baldwin Township, Allegheny County, Pa., assignor to Westinghouse Electric Corporation, East Pittsburgh, Pa., a corporation of Pennsylvania Application March 28, 1956, Serial No. 574,442

6 Claims. (Cl. 340—174)

The invention relates generally to memory elements, and more particularly to memory elements for electrical control systems.

The object of the invention is to provide a memory element for a control system in which there may be wide variations in the output voltage without unbalancing the functioning of the memory element.

Other objects of the invention will, in part, be obvious and will, in part, appear hereinafter.

The invention accordingly comprises the features of construction, combination of elements and arrangement of parts which will be exemplified in the system hereinafter set forth and the scope of the application of which will be indicated in the claims.

For a fuller understanding of the nature and objects of the invention reference should be had to the following detailed description taken in connection with the accompanying schematic diagram, in which, the single figure is a circuit diagram of a memory element for an electrical control system embodying the features of the invention.

In the memory element for an electrical control system illustrated in the figure a number of non-linear devices which will be described in detail hereinafter are employed in the circuits which will be described and traced. The non-linear devices are so disposed in the circuits that they permit the flow of a predetermined magnetizing current to the coils or windings on the core members without any substantial voltage drop and they also protect the circuits and apparatus from excessive current flow. Further, as the description proceeds and the circuits are traced, it will seem that in some instances the electric currents flow through rectifiers or diodes in the backward or reverse direction; however, what actually happens is that there is a reduction in the electric current flowing in the forward direction in the circuits. The reduction in current flow may be predetermined by design to effect the performance of functions required from the control system of which the memory element is a part.

In the memory element illustrated a source of power shown generally at 10 comprises a transformer with a primary winding 11 and two secondary windings 12 and 13. Each of the secondary windings 12 and 13 are divided into two sections 14 and 15 and 16 and 17, respectively. Each section of the secondary windings is designed to impress about 15 volts across its load.

Two core members 18 and 19 are provided. Core members having suitable characteristics for this purpose can be made from magnetic material sold to the trade under the trade name Hipernik. The cores may be wound from strips or built up from laminations of this material and of a size and capacity to meet design specifications. Ordinarily the cores for memory circuits are required to have a characteristic square hysteresis loop. Such cores are desirable for the present memory element. However, it has been found that as the result of the functioning of this system, cores having a hysteresis loop that is far from being square can be used successfully.

The cores 18 and 19 are provided with reset windings 20 and 22 and gating windings 21 and 23 respectively. The relation of the number of turns in the windings 20 and 22 relative to the windings 21 and 23, respectively, may be varied to meet different design conditions. However, in this embodiment of the invention, the number of turns in the windings 20 and 22 relative to the windings 21 and 23, respectively, is in the ratio of 1:2. Memory elements constructed with this ratio of turns in the reset windings 20 and 22 relative to the gating windings 21 and 23 have been found to be quite satisfactory.

The gating windings 21 and 23 are utilized for driving the cores 18 and 19, respectively, toward positive saturation while the reset windings 20 and 22 are utilized for driving the cores 18 and 19, respectively, toward negative saturation. The functioning of these windings will be explained as the specification proceeds.

As illustrated, the windings 21 and 23 are connected to opposite terminals of the secondary winding 13 of the transformer 10. Rectifiers 26 and 27 are connected between the terminal 24 and the windings 21 and 23, respectively, to prevent a flow of current from the output terminals to the windings.

It will be assumed that the periods on the diagram will indicate positive terminals or the flow of current into a winding from a positive terminal. Therefore, when the transformer is energized, current will flow from the terminal of the secondary winding section 17 through conductor 28, winding 21, conductor 29, rectifier 26 to output terminal 24. If the core 18 stands at the neutral point in the hysteresis loop for the core then the current flowing in the gating circuit traced will drive the core 18 to positive saturation and current will flow to the output terminal 24.

Terminals of the sections 16 and 17 of the transformer 10 are connected through conductor 30 to ground at 31. A circuit may be traced from the central terminals of the transformer 10 through conductor 30, ground 31, ground 32, conductor 33, rectifier 34, resistor 35, rectifier 36 to a terminal of the section 14.

When the core 18 is driven to positive saturation and an output is delivered to the terminals 24 and 25, a feedback circuit will be established from the output terminal 24 through conductors 38, 39 and 40, rectifier 41, the reset circuit 22 of the core 19, conductor 42 to the non-linear device comprising rectifier 34 and resistor 35. In this manner the core 19 is driven to negative saturation.

When the core 18 is driven to positive saturation an output will be delivered to the terminal 24 for part of a cycle. At the end of this half cycle the voltage will be reversed in the transformer sections 16 and 17. Current will flow from the terminal of the secondary winding section 16 through conductor 43, winding 23 of core 19, conductor 44, rectifier 27 to the non-linear device comprising rectifier 45 and resistor 46. The core 19, when current starts to flow from the transformer through the winding 23, stands at negative saturation. Therefore, during the first half cycle of current flow the energy is consumed in driving the core 19 to positive saturation. The result is that there is no voltage output. When there is no output voltage, no feedback current flows through conductor 39. Consequently, there is no current flow in the feed back circuit for the reset winding 20 of the core 18. Therefore, at the beginning of the first half of the second cycle the core 18 will stand positively saturated and when current flows from the transformer secondary 13 through the gating circuit an output will result and current will flow to the output terminal 24 for another half cycle.

When a voltage is applied across the reset winding 22 it will induce a voltage in the gating winding 23 of the core 19. In the design of the windings 22 and 23 the latter is made with twice the number of turns in the former. Therefore, the induced voltage in the winding 23 is twice the voltage across the winding 22. Consequently, the voltage induced in the winding 23 is greater than the voltage across the section 16 of the transformer 10. This would suggest that current might flow from the positive terminal of the winding 23 through the resistor 50 or through an external output load and increasing the exciting current requirements for the winding 22. If such occurred, complete reset of core 19 may not occur without the use of excessive non-linear bias current. However, because of the positive saturation of the core 18 a voltage exists across the rectifier 45 which is equal to the output voltage. Therefore, we have opposed to the voltage across the winding 23, the voltage across the transformer section 16 of the secondary winding 13 plus the voltage across the rectifier 45 which is connected across the output terminals 24 and 25. Consequently, the induced voltage in the winding 23 is balanced or neutralized by these two voltages and no current will flow tending to increase the reset current requirements of winding 22 of the core 19.

When a voltage is being delivered from the terminals 24 and 25 to a load there will be a decrease in the average voltage drop across the terminals and a corresponding voltage drop across the reset winding 22. As the voltage across the winding 22 drops, the induced voltage across the winding 23 drops. If the voltage across the winding 22 dropped to less than half the normal voltage then the reset winding 22 would not drive the core 19 to complete negative saturation. If the reset winding 22 does not drive the core 19 to complete negative saturation then when current flows from the section 16 of the secondary winding 13 of the transformer through the gating winding 23 of the core 19 on the next half cycle it would not only drive the core 19 to positive saturation but would build up an output and deliver some current to the reset winding 20 which would upset the proper functioning of the memory element. Therefore, the system is so designed that the voltage across reset winding 22 cannot be driven below half the output voltage which in applications is usually made about 6.7 volts average and which is the equivalent of the R. M. S. voltage across the section 16 of the secondary 13 of the transformer winding.

Accordingly, when the transformer 10 is energized and current flows from section 17 of the secondary winding to the gating winding 21 of the core 18 driving it to positive saturation and producing an output, there will be a feedback circuit established to the reset winding 22 of the core 19 which drives it to negative saturation and this state is maintained until something is done to set up a circuit to drive the core 18 to negative saturation. Otherwise, the winding 21 will deliver an output for half of each cycle.

Assuming now that a signal is delivered from the terminal 47, current flows through the rectifier 48, conductor 49 the reset winding 20 of the core 18 and the rectifier 53 to ground. The rectifier 53 is part of a non-linear circuit hereinbefore mentioned. This signal should be of a voltage of sufficient magnitude to drive the core 18 to negative saturation notwithstanding the currents flowing in the circuit. If the signal delivered through terminal 47 is from a direct-current source and is initiated when current is flowing in the winding 21 causing an output, even if it is only of the same voltage as the output voltage, it will function as soon as the half cycle causing the development of an output has ended, and drive the core 18 to negative saturation.

When the core 18 has been driven to negative saturation and current flows from the section 16 of the secondary winding 13 of the transformer to the gating winding 23, the total energy will be consumed in driving the core 18 to positive saturation and no output will be delivered to the output terminals. On the next half cycle current will flow in the winding section 17 of the secondary winding 13 of the transformer to the gating winding 21 but since the core has been driven to negative saturation no output will be developed and, therefore, no feedback current will flow to the reset winding 22 of the core 19. Consequently, on the following half cycle when current flows again to the gating winding 23 of the core 19, an output will be developed across the terminals 24 and 25 since the gating winding is connected through rectifier 27 to the non-linear device comprising the rectifier 45 and resistor 50.

A feedback circuit will now be established for the reset winding 20 of the core 18. The feedback circuit extends from the conductor 38 through conductor 39, rectifier 51, conductor 52 through the winding 20 to the non-linear device including the rectifier 53 and resistor 54. Therefore, even if the signal is discontinued, the feedback circuit to the winding 20 will drive the core 18 to negative saturation every second half cycle with the result that the periodic half cycle flow of current from the transformer section 17 to the gating winding 21 of the core 18 will not build up an output. Further no feedback circuit will be established to drive the core 19 to negative saturation. Therefore, an output will be delivered every half cycle through the winding 23 to the output terminals 24 and 25.

When a voltage is impressed across the winding 20 during the reset half cycle, a voltage will be induced in the gating winding 21. As pointed out hereinbefore in this embodiment of the invention, the number of turns in the gating winding 21 is twice that of the reset winding 20. Therefore, the induced voltage in the winding 21 will be approximately twice that of the voltage impressed across the winding 20. This induced voltage is balanced out by the voltage across the section 17 of the secondary winding 13 plus the voltage across the non-linear device including the rectifier 45. Therefore, no current will be caused to flow in the circuit because of the induced voltage and the output condition will not be disturbed. Further in designing, provision is made to assure that the voltage impressed across the winding 20 will not drop below half its value because of the load connected across the output terminals 24 and 25.

It will be noted that the non-linear device comprising the rectifiers 45 and resistor 46 is connected through conductor 55 through rectifier 56 to one side of the secondary winding 12 of the transformer 10, while the non-linear device comprising the rectifier 45 and resistor 50 is connected through the conductor 57 and rectifier 36 to the opposite side of the secondary winding 12 of the transformer 10.

When current is being supplied to the output terminals 24 and 25 through the gating winding 23, the core 19 will remain positively saturated while the core 18 will be driven to negative saturation during every half cycle that current is supplied to the output terminals. In other words, current will be delivered through the gating winding 23 through to the output terminals every half cycle and during the corresponding half cycle the core 18 will be driven to negative saturation. Since, due to the design of the core 18, the energy delivered to the core 18 during the half cycle when the feedback circuit to the coil 20 is not functioning is absorbed in driving the core 18 to positive saturation, no voltage will appear at the output terminals 24 and 25 during this half cycle.

In order to interrupt the delivery of current to the terminals 24 and 25 through the gating winding 23, an input source 58 is provided for supplying a signal to the reset winding 22. The input will flow from terminal 58 through rectifier 59, conductor 60, winding 22, conductor 42, rectifier 34 and conductor 33 to ground at 32. The rectifier 34 is part of a non-linear circuit hereinbefore mentioned. The voltage impressed on the circuit through the signal input terminal 58 will effect the delivery of sufficient current to drive the core 19 to negative saturation during the half cycle when current is not being delivered to the output terminal 24 through the gating winding 23. Therefore, on the next half cycle when current flows in the gating winding 23, tending to drive the core to positive saturation, all the energy will be consumed in driving the core to positive saturation and no output will be delivered. Further, the feedback circuit to the winding 20 will not be established and the core 18 will be driven to positive saturation during one half cycle and on every second half cycle following will deliver an output to the terminal 24. The feedback circuit previously traced herein for driving the core 19 to negative saturation will be established and, even if the input signal through the terminal 58 is discontinued, the core 19 will be driven to negative saturation during every half cycle and no output will be delivered to the terminal 24 through the gating winding 23. Substantially the same value as the voltage impressed across the gating winding 23, the signal will drive the core 19 to negative saturation during the half cycle when the core 19 is not being driven to positive saturation by the current flowing in the gating winding 23.

The non-linear circuits for the reset windings 20 and 22 of the cores 18 and 19 are connected as follows. The first non-linear circuit includes the rectifier 53, the resistance 54, the rectifier 56, and secondary winding 15 of the transformer 10 serially connected between two grounded terminals. The second non-linear circuit includes the rectifier 34, the resistance 35, the rectifier 36 and the secondary winding 14 of the transformer serially connected between two ground terminals. The secondary windings 14 and 15 have a common terminal that may be referred to as a center tap.

The combination of the winding 15, rectifier 56, the winding 14, and rectifier 36 furnishes half-wave pulsating direct current, the half waves being 180° out of phase with each other. The values of the resistances 54 and 35 are so chosen that the current flow in the forward direction through the rectifiers 53 and 34 will be slightly larger than the signals to be impressed at the terminals 47 and 58. Thus, the rectifiers 53 and 34 are alternately gated to allow a reverse flow of current from signals impressed at the terminals 47 and 58, respectively.

For a more detailed description of a non-linear circuit of the type described above, reference is made to R. A. Ramey, "The single-core magnetic amplifier as a computer element," A. I. E. E. Transactions, vol. 71, Part I, 1952, pp. 442–446.

If the input signals delivered at the terminals 47 and 58 are of alternating current it will be necessary that the signals be so disposed in phase that they will accomplish the desired end. The signal delivered at the terminal 47, if alternating current, should be 180° out of phase with the current flowing in the gating winding 21. The signal delivered to the terminal 58 should be 180° out of phase with the current delivered to the gating winding 23.

If it is desired to stop the functioning of the memory element then signals will be delivered at terminals 47 and 58. In this manner both of the reset windings 20 and 22 would be energized to drive the cores 18 and 19, respectively, to negative saturation. When this occurs then all the current delivered to the gating windings 21 and 23 would be consumed in driving the cores 18 and 19, respectively, to positive saturation. Therefore, no output would be delivered to the output terminal 24. This condition would continue as long as signals were being delivered through input terminals 47 and 58. If the delivery of current through the input terminals was interrupted, one of the cores 18 or 19 would be driven to positive saturation and output current delivered either on the first or second half cycle depending upon the core which was first driven toward positive saturation. An output would be delivered to the terminal 24 and a voltage built up across 24 and 25. The core that will function to effect the delivery of current will depend on the point in the cycle in which the signals through terminals 47 and 58 are interrupted.

In the application of this memory element it may be connected into any control system requiring the storing of information and used either alone or in combination with other memory elements. The capacity of the memory element will be predetermined by design.

While the memory element may be designed to be operated at nearly any voltage, it is usual practice to provide a transformer 10 which will have 15 volts across any of the secondary winding sections 14, 15, 16 and 17. It is also standard practice to deliver signals through the signal terminals 47 and 58 at a voltage of about 15 volts R. M. S. or 6.7 volts A. V. G.

If a 15 volt signal is delivered at the terminals 47 and 58 the impressed voltage on the windings 20 and 22 will be the same. However, since the windings 20 and 21 are in the ratio of 1:2 the voltage induced in the winding 21 when a signal is delivered to the winding 20 will be of the order of 30 volts. The same is true for the windings 22 and 23. The manner in which the voltage induced in the windings 21 and 23 offset has already been explained and will not cause any unbalance in the system.

Since certain changes may be made in the above construction, and different embodiments of the invention could be made without departing from the scope thereof, it is intended that all matter contained in the above description or shown in the accompanying diagram shall be interpreted as illustrative and not in a limiting sense.

I claim as my invention:

1. In a memory element, in combination, a plurality of cores, a gating winding and a reset winding on each core, circuits connecting the gating windings and the reset windings to means for connecting power to the memory element, circuits for delivering a signal to each of the reset windings to control the operation of the memory element, a circuit connecting the gating windings to one another, the connecting circuit being connected to the gating windings on the sides opposite to the circuits leading from the means for connecting power to the memory element, and feedback circuits disposed between the connecting circuit of the gating windings and the reset windings whereby when an output is being delivered through one gating winding on one core a current is delivered to the reset winding on the other core tending to drive it toward negative saturation.

2. In a memory element, in combination, a plurality of cores, a gating winding and a reset winding disposed on each core, input and output terminals provided on each of the windings, circuits connecting the input terminals of the gating windings means for connecting power to the memory element, circuits connecting the output terminals of the gating windings to the main output terminal and to one another, a feedback circuit connected to the input terminals of the reset windings and the main output terminal whereby when one core is driven to positive saturation and current is being delivered to the main output terminal the other core will be driven toward negative saturation, and means for blocking the flow of current through the gating winding on the core driven to negative saturation as a result of voltage induced in the gating winding from the reset winding.

3. In a memory element, in combination, a plurality of cores, a gating winding and a reset winding disposed on each core, input and output terminals provided on each of the windings, circuits connecting the input terminals of the gating windings to terminals for connecting power to the memory element, circuits connecting the output terminals of the gating windings to a main output terminal and to one another, a feedback circuit connected to the input terminals of the reset windings and the main output terminal whereby when one core is driven toward positive saturation and current is being delivered to the main output terminal the other core is driven toward negative saturation, and means for impressing a voltage across the gating winding of the core driven to negative saturation which is substantially equal to the voltage induced in said gating winding by the voltage impressed across the reset winding when the core is driven toward negative saturation.

4. In a memory element, a plurality of cores, a gating winding and a reset winding disposed on each core, input and output terminals provided on each of the windings, circuits connecting the input terminals of the gating windings to means for connecting power to the memory element, circuits connecting the output terminals of the gating winding to the main output terminal and to one another, a feedback circuit connected to the input terminals of the reset windings and to the main output terminal whereby when one core is driven to positive saturation and current is being delivered to the main output terminal the other core is driven toward negative saturation, a non-linear device connected across each of the gating windings, the non-linear devices being so disposed that a voltage substantially equal to the voltage across the gating winding on the core driven to positive saturation is imposed across the gating winding on the core driven to negative saturation and in opposition to the voltage induced by the reset winding.

5. In a memory element, in combination, a plurality of cores, a gating winding and a reset winding disposed on each core, input and output terminals provided on each of the windings, circuits connecting the input terminals of the gating windings to means for connecting power to the memory element, circuits connecting the output terminals of the gating windings to a main output terminal and to one another, a feedback circuit connected to the input terminals of the reset windings and the main output terminal whereby when one core is driven to positive saturation and current is being delivered to the main output terminals the other core is driven toward negative saturation, the voltage impressed across the gating winding carried by the core driven to negative saturation from the source of power being cumulative with the voltage across the output terminals and opposed to the voltage induced in the gating winding on the core driven toward negative saturation when the reset winding is energized to drive the core toward negative saturation.

6. In a memory element, in combination, a plurality of cores, a gating winding and a reset winding disposed on each core, input and output terminals provided on each of the windings, circuits connecting the input terminals of the gating windings to means for connecting power to the memory element, a main output terminal, a plurality of non-linear devices, circuits connecting the gating windings to the main output terminal through the non-linear devices, the circuits also being connected to one another, a feedback circuit connected to the input terminals of the reset windings and the main output terminal whereby when one core is driven to positive saturation and current is being delivered to the main output terminal the other core is driven to negative saturation, the voltage impressed across the gating winding carried by the core driven toward negative saturation from the source of alternating current power being cumulative with the voltage across the non-linear device to which the gating winding is connected and opposed to the voltage induced in the gating winding when the reset winding is energized to drive the core toward negative saturation.

No references cited.